Nov. 16, 1965     C. R. LE WAN     3,218,403
RESET MECHANISM FOR POWER OPERATED REVERSIBLE LOADS
Filed Jan. 13, 1961     5 Sheets-Sheet 1
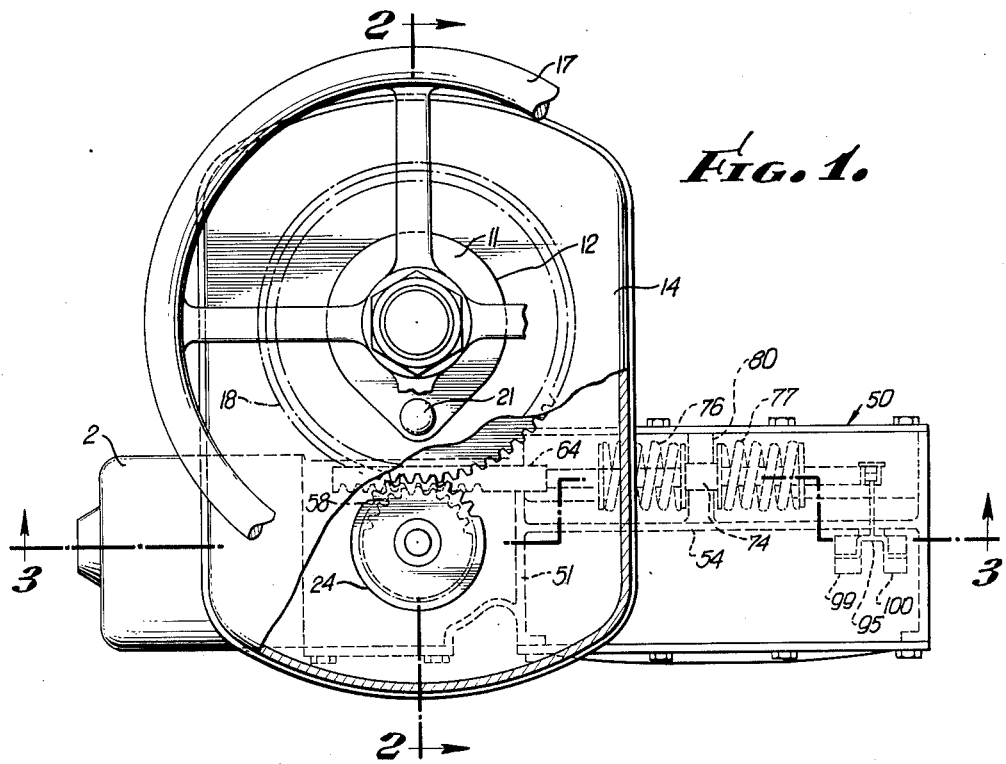
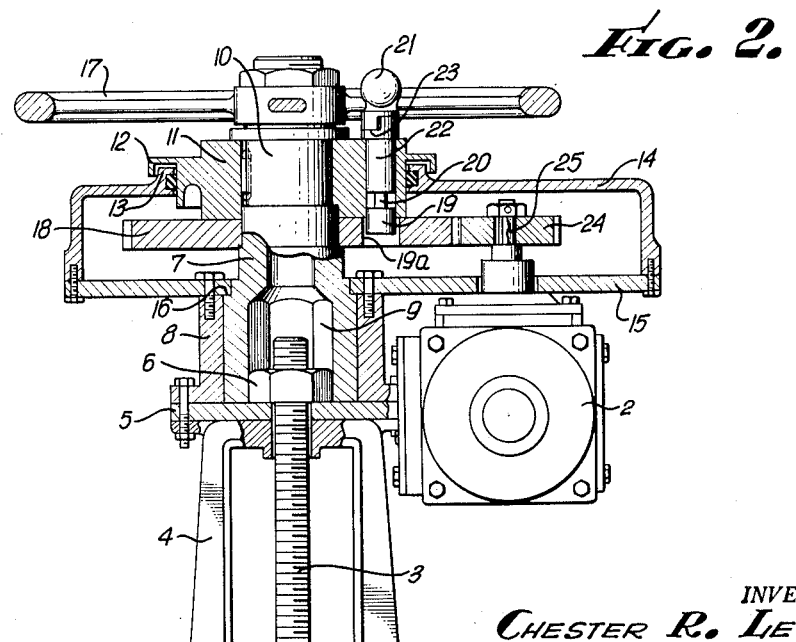
INVENTOR.
CHESTER R. LE WAN
BY
Flam and Flam
ATTORNEYS.

Nov. 16, 1965   C. R. LE WAN   3,218,403
RESET MECHANISM FOR POWER OPERATED REVERSIBLE LOADS
Filed Jan. 13, 1961   5 Sheets-Sheet 2

INVENTOR.
CHESTER R. LeWAN
BY
Flam and Flam
ATTORNEYS.

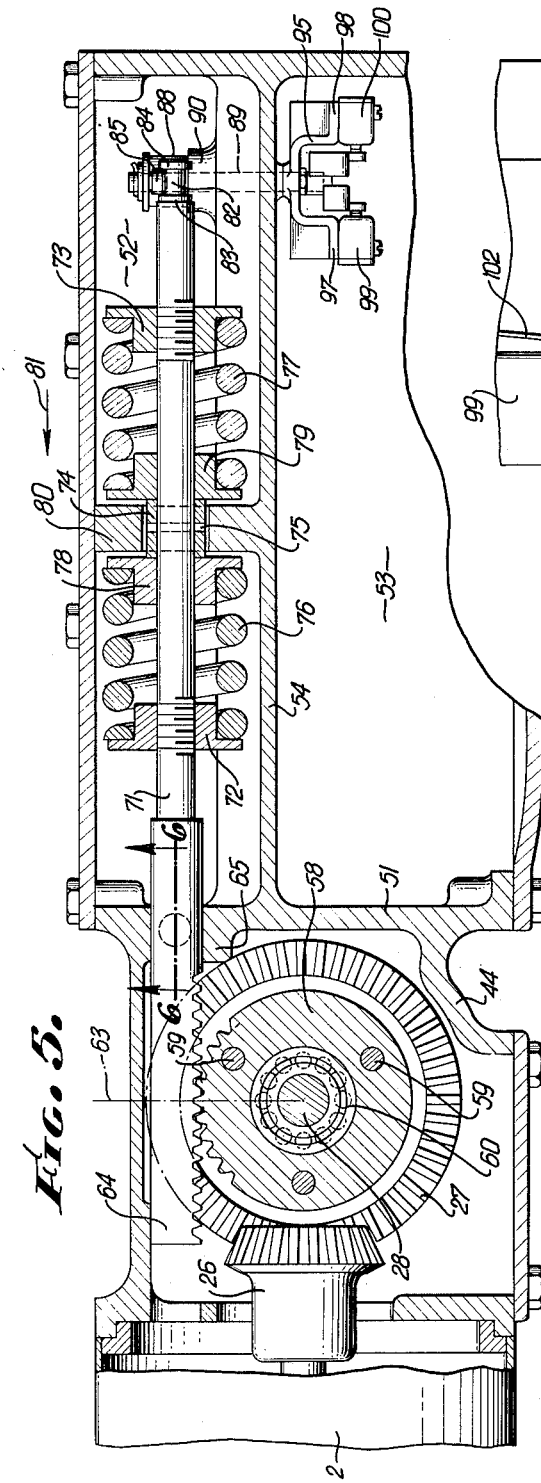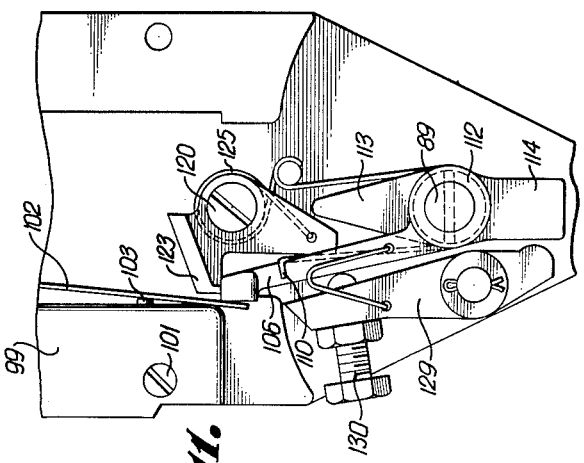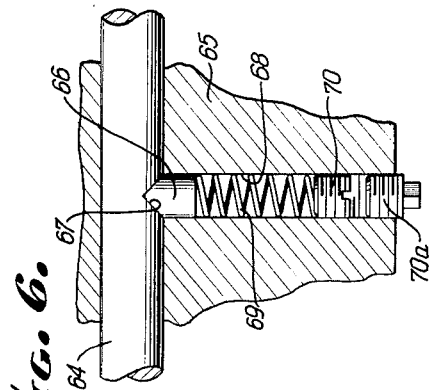

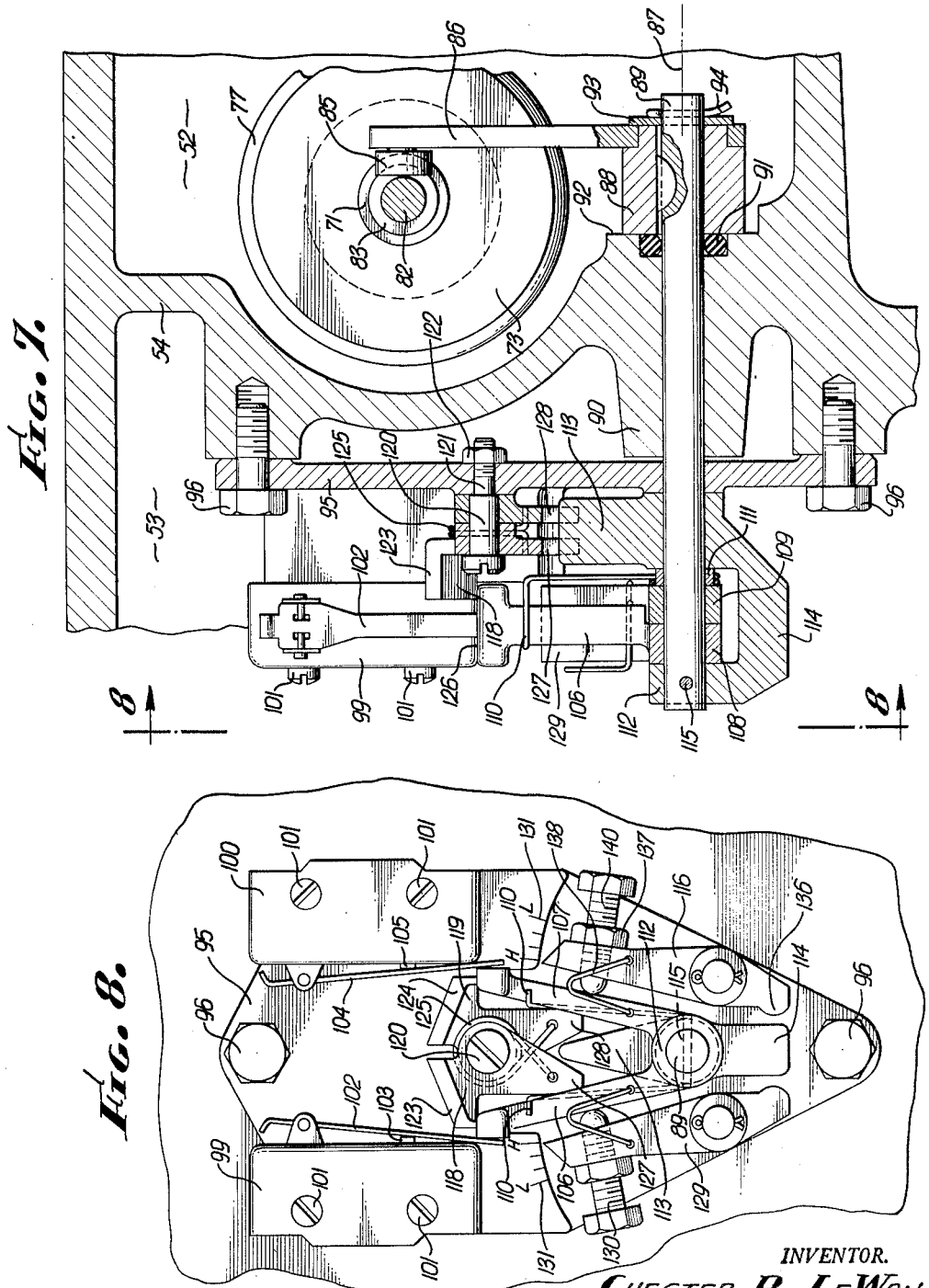

Nov. 16, 1965   C. R. LE WAN   3,218,403
RESET MECHANISM FOR POWER OPERATED REVERSIBLE LOADS
Filed Jan. 13, 1961

INVENTOR.
CHESTER R. LE WAN
BY Flam and Flam
ATTORNEYS.

United States Patent Office 3,218,403
Patented Nov. 16, 1965

3,218,403
RESET MECHANISM FOR POWER OPERATED REVERSIBLE LOADS
Chester R. Le Wan, La Crescenta, Calif., assignor to International Telephone and Telegraph Corporation, Baltimore, Md., a corporation of Maryland
Filed Jan. 13, 1961, Ser. No. 82,432
5 Claims. (Cl. 200—47)

This invention relates to the control of drives for reversible loads, such for example as a gate valve closure.

Should the valve be of relatively large size, it is common to provide an electric motor for moving the closure either toward open or toward closed position. Some assurance, however, must be provided that the motor will be deenergized in the event an unforeseen obstruction is encountered by the closure. In addition, the control circuits for the motor are so conditioned that reverse rotation of the motor would be permitted.

In a prior application filed in the name of Richard D. Sibley, on August 26, 1960, under Serial No. 52,132, and assigned to the same assignee as this application, a system of this character is disclosed and claimed. The present invention has certain advantages which may now be set forth.

It is one of the objects of this invention to provide a compact and inexpensive apparatus to perform these functions.

It is another object of this invention to provide a conveniently adjustable device for determining the maximum torque the motor may exert before the deenergization is effected. In this connection, the positions of the circuit controllers influencing the motor need not be altered for effecting this adjustment.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a top plan view, partly broken away, of apparatus incorporating the invention;

FIG. 2 is a sectional view, taken along a plane corresponding to line 2—2 of FIG. 1;

FIG. 5 is a sectional view, taken along a plane corresponding to line 5—5 of FIG. 3;

FIG. 6 is a fragmentary sectional view, taken along a plane corresponding to line 6—6 of FIG. 5;

FIG. 7 is an enlarged sectional view, taken along a plane corresponding to line 7—7 of FIG. 3;

FIG. 8 is an elevational view, taken from a plane corresponding to line 8—8 of FIG. 7;

FIG. 11 is a fragmentary view, similar to FIG. 8, of a modified form of the invention.

Figure 3:
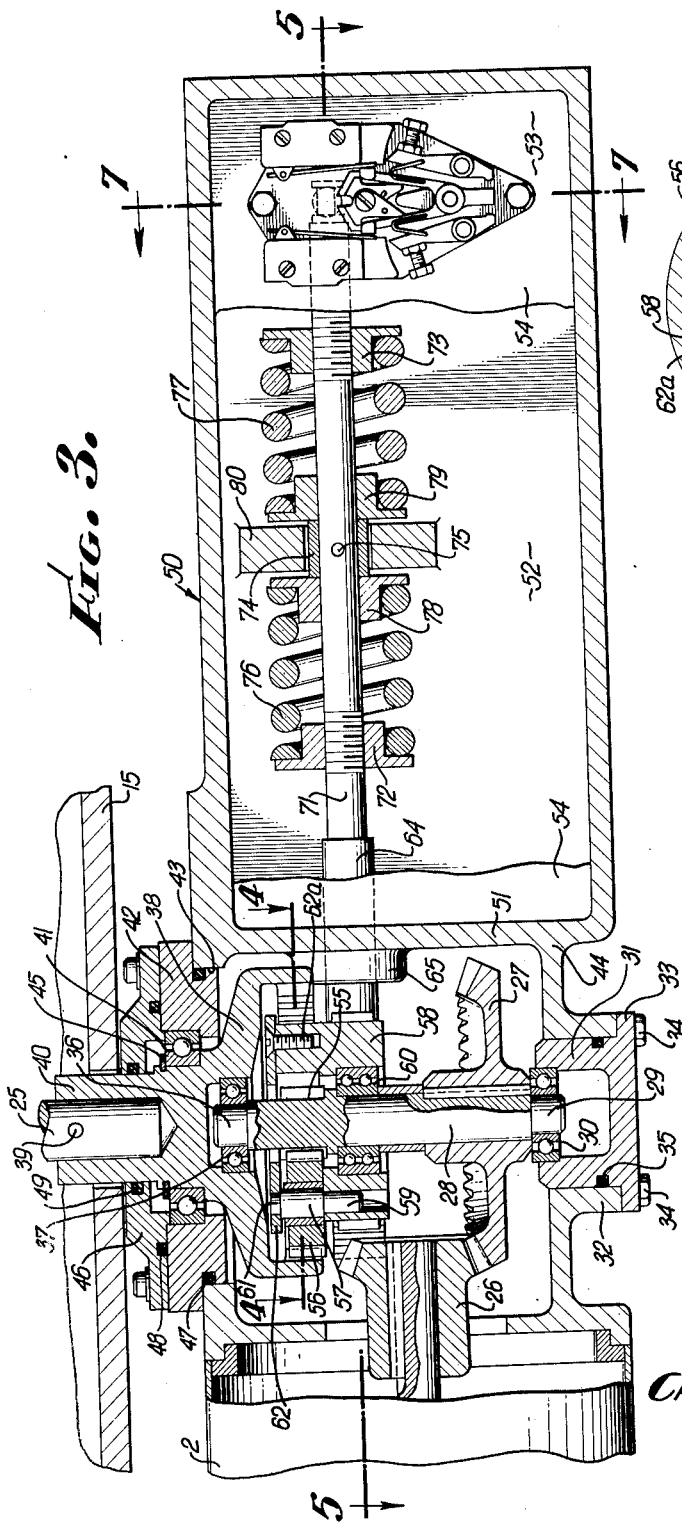
FIG. 3 is an enlarged sectional view, taken along a plane corresponding to line 3—3 of FIG. 1.

In the present instance, the apparatus incorporating the invention is illustrated for operating a gate valve closure 1 diagrammatically illustrated in FIG. 2. This valve closure 1 is arranged to be optionally operated by hand or by power, as by an elecrtic motor 2 (FIGS. 1, 2 and 3).

The valve closure 1 is connected to a lead screw 3 (FIG. 2). This lead screw 3 extends through a clearance aperture in the top of a yoke 4 mounted on the valve body in which the valve closure 1 is accommodated.

The yoke 4 mounts a support 5 serving as a rest for a nut 6 which engages the lead screw 3. Since the valve closure 1 is guided for longitudinal movement, rotation of the nut 6 will cause the lead screw to rise or lower in accordance with the direction of rotation.

For rotating the nut 6 in either direction for raising or lowering the valve closure 1, use is made of a hollow shaft structure 7. This hollow shaft structure is journalled in a bushing or bearing standard 8 mounted on the support 5. This standard is appropriately bolted to the support 5 and to the top of the yoke 4.

The shaft structure 7 has a hexagonal recess 9 in driving relation to the nut 6. Accordingly, when the shaft structure 7 is rotated in one or the other direction, the valve closure 1 is raised or lowered.

The upper end 10 of the shaft structure 7 is reduced in diameter to accommodate a collar 11. This collar 11 is keyed to the upper portion 10 of the shaft. It has a flange 12 overlying a boss 13 formed on a casing 14. The bottom wall 15 of this casing is mounted on the top edge of the standard 8, and engages a shoulder 16 formed in the shaft structure 7. In this way the shaft structure 7 is held from axial movement.

A hand wheel structure 17 is appropriately connected to the end 10 of the shaft structure 7, for rotating it. The hand wheel 17 may be used optionally for raising or lowering the lead screw 3.

Ordinarily the shaft structure 7 is rotated by the aid of a gear wheel 18 which may optionally be coupled to the shaft structure 7. A pin 19 slidably mounted in the collar 11 may be moved to the position of FIG. 2 for connecting the gear 18 in driving relation to the collar 11, which in turn drives the shaft structure 7 by being keyed to the upper end 10 of that shaft structure. The pin 19 is connected by a stem 20 to a knob 21 and is guided by the tubular sleeve 22. The upper enlarged end of the tubular sleeve has a stepped configuration; and knob 21 has a lower portion which interfits this stepped configuration. Obviously, upon movement of the knob 21 upwardly, the lowermost surface 23 of the knob 21 may be caused to rest on the uppermost surface of the sleeve or guide 22, holding the pin 19 out of engagement with the aperture 19a formed in the gear 20.

The gear 20 is adapted to be power driven by a pinion 24 which is keyed to an upright shaft 25 (see also FIG. 3). The shaft 25 is arranged to be driven in one or the other direction by the aid of a structure illustrated most clearly in FIGS. 3, 4 and 5. The motor 2 drives a bevel pinion 26. This bevel pinion serves to drive a bevel gear 27. This bevel gear is keyed to a vertical shaft 28 having a lower reduced portion 29 mounted for rotation in a ball bearing structure 30. The outer race of this ball bearing structure is supported at the upper edge of a cup 31 telescoped within a boss 32 and held in place by the aid of the flange 33, and screws 34. The boss 32 forms a part of a casing structure 44 which serves, as hereinafter described, to support the gearing and its associated parts.

In order to provide a sealed space for the gearing, the cup 31 may carry an O-ring 35.

The upper end 36 of the shaft 28 is similarly rotatably supported by ball bearing structure 37. The outer race of this ball bearing structure is located in a recess formed in an internal gear structure 38 driven by planetary gearing as hereinafter explained, said planetary gearing being coupled to bevel gear 27.

This internal gear 38 carries a shaft projection 40. This projection is joined by the aid of the pin 39 to the lower end of the shaft 25.

Figure 4:
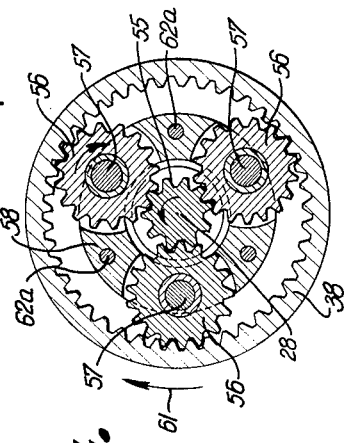
FIG. 4 is a sectional view, taken along a plane corresponding to line 4—4 of FIG. 3.

The internal gear 38 is mounted in ball bearing structure 41 having an outer race supported in a base 42. This base 42 interfits into an aperture or bore 43 of the casing member 44. The inner race of the ball bearing structure 41 may be held in place by the aid of a split spring ring 45. The base 42 is held in place by the aid of a collar 46 clamped appropriately to the housing 44. O-rings 47, 48 and 49 ensure against the entry of dust into the casing 44. The extension 50 of casing 44, by the aid of a transverse wall 51, provides a space divided into two chambers 52 and 53 by the aid of a horizontal wall 54 (FIG. 4).

The manner in which the internal gear 38 is rotated by the aid of the bevel gear 27 may be best explained in connection with FIGS. 3 and 4.

Thus, the shaft 28 is formed with an integral pinion 55 which meshes with three planetary gears 56. These planetary gears are rotatably mounted upon the pins 57 equiangularly supported in a mutilated gear 58. For this purpose, each of the pins 57 is provided with a reduced shank 59 journalled in appropriate apertures located in the mutilated gear 58; and they each carry a reduced upper portion 61 journalled in a plate 62. This plate is fastened to the top surface of gear 58 as by screws 62a. The mutilated gear in turn is rotatably mounted by the aid of a roller bearing structure 60 having its inner race mounted on shaft 28 and its outer race mounted in an appropriate recess in the mutilated gear 58.

Assuming for the moment that the mutilated gear 58 is non-rotary, the pinion 55 may be assumed to be rotating in a counter-clockwise direction for closing the valve closure 1. With this direction of rotation, each of the planetary gears 56 is rotated in a clockwise direction. Since the planetary gears are restrained against planetary movement, these gears 56 cause the outer gear wheel 38 to rotate in a clockwise direction as indicated by arrow 61. This rotation, of course, is imparted to the shaft 25 and thence to the gear 24 (FIG. 2) for driving the shaft structure 7.

In the position shown in FIGS. 3, 5 and 6, the apparatus is disclosed as in its quiescent position, corresponding to deenergization of motor 2. Segment 58 is symmetrically disposed about a vertical line 63 and is in engagement with a rack bar 64. This rack bar is slidable in a boss 65 formed integrally with the wall 51, and extends into the chamber 52. It is normally restrained against axial movement by the aid of a spring pressed detent 66 (FIG. 6) engaging a V-shaped notch 67 in the bar 64. The detent 66 is in the form of a pin having plane inclined ends coming to an edge, and slidably mounted in a bore 68 and is urged into the notch 67 by compression spring 69. The outer end of the bore 68 is threaded for the reception of a headless screw 70 for adjusting the compression of spring 69. A supplemental screw 70a closes the opening 68.

Assuming that the motor 2 is energized so as to cause the internal gear 38 to move in a clockwise direction as indicated by the arrow 61, the reaction to the torque of the motor 2 urges segment gear 58 in a counter-clockwise direction. This causes the tapered detent or pin 66 to ride upwardly on the right-hand face of the notch 67. It serves to absorb the shock attendant upon starting movement of the load.

As the torque increases beyond a prescribed or pre-set limit, the detent 66 is moved entirely out of the recess 67. A spring is compressed to a degree of compression corresponding to the amount of torque exerted by the motor.

For this purpose, the rack bar 64 is provided with a reduced extension 71 (FIGS. 3 and 5). This reduced extension carries a pair of flanged collars 72 and 73 spaced apart and threadedly engaging the extension 71. Intermediate the collars is a sleeve 74 fastened as by the aid of the pin 75 to the extension 71. This sleeve extends through a partition 80 in chamber 52. Adjacent the ends of this sleeve are two slidable collars 78 and 79. Between collars 72 and 78 there is a strong compression spring 76, urging the collar 78 toward the right. Similarly, a compression spring 77 between collars 73 and 79, urges collar 79 toward the left.

When the motor 2 is deenergized, the sleeve 74 assumes a central position with respect to the partition 80 and collars 78 and 79 are both in contact with the ends of sleeve 74. There is a symmetrical clearance between each of the collars 78 and 79 and the corresponding adjacent surface of the wall 80.

As soon as the motor 2 is energized, say for example, in a direction to move the valve closure 1 downwardly toward closing position, the torque exerted on the segment gear 58 is in a direction to move the rack bar 64 and its extension 71 toward the left as shown by the arrow 81 (FIG. 5). Under such circumstances the first part of the movement takes up the clearance between the left-hand face of the collar 79 and the right-hand face of the partition 80. This initial movement is sufficient to perform a resetting operation to condition the motor circuits so that the motor can, if desired, be energized in a direction to raise the closure 1. In this way, should the torque of the motor reach an undesired value, the deenergization of the motor for closing movement does not prevent the reenergization of the motor for opening movement only. The same relative effects are obtained when the motor torque for opening movement exceeds a definite value.

Upon continued increase in torque, the compression spring 77 is compressed to a point sufficient to deenergize the motor 2 to stop further closing movement.

How these functions are performed may be best understood by reference to FIGS. 5, 7 and 8.

Thus, as shown in FIG. 5, the right-hand end of the extension 71 is provided with a reduced portion 82 having end collars 83 and 84 of enlarged size. Located between these collars is a cylindrical member 85 (FIG. 7) mounted at the upper end of a lever arm 86. The diameter of the cylindrical member 85 is just sufficient to extend between the two flanges 83 and 84. Accordingly, just as soon as the bar 64 moves in either direction, the arm 86 will be angularly moved about an axis 87.

For this purpose, the arm 86 is fixed, in any appropriate manner, to a hub member 88 that is keyed to a shaft 89. This shaft 89 is journalled in a boss 90 formed integrally with the wall 54. An O-ring 91 may be utilized to maintain the chamber 52 sealed. The left-hand end of the hub 88 abuts a surface 92 formed on the wall 54 and is retained against axial movement by the aid of a washer 93 and a cotter pin 94.

A bracket or support 95 is appropriately apertured to permit the passage of the shaft 89. This bracket is attached to the wall 54 by the aid of the screws 96.

The bracket 95 has vertical flanges 97 and 98 (FIG. 5). These flanges extend forwardly of the body of the bracket, providing a space below the flanges for mechanical control equipment, to be later described. Upon these flanges are mounted a pair of opposed circuit controllers 99 and 100. These circuit controllers 99 and 100 are attached to the flanges 97 and 98 by the screws 101. Circuit controller 99 has a lever or actuating arm 102 appropriately pivotally mounted so as to cause it to depress a button 103 for holding the switch 99 in one position. For maintaining the button 103 depressed, the plunger or button 103 must be held by a force exerted on the arm 102 into the position of FIG. 8. Release of the arm 102 frees the plunger 103 which moves outwardly, to appropriately affect the control circuits.

Figures 9, 10:
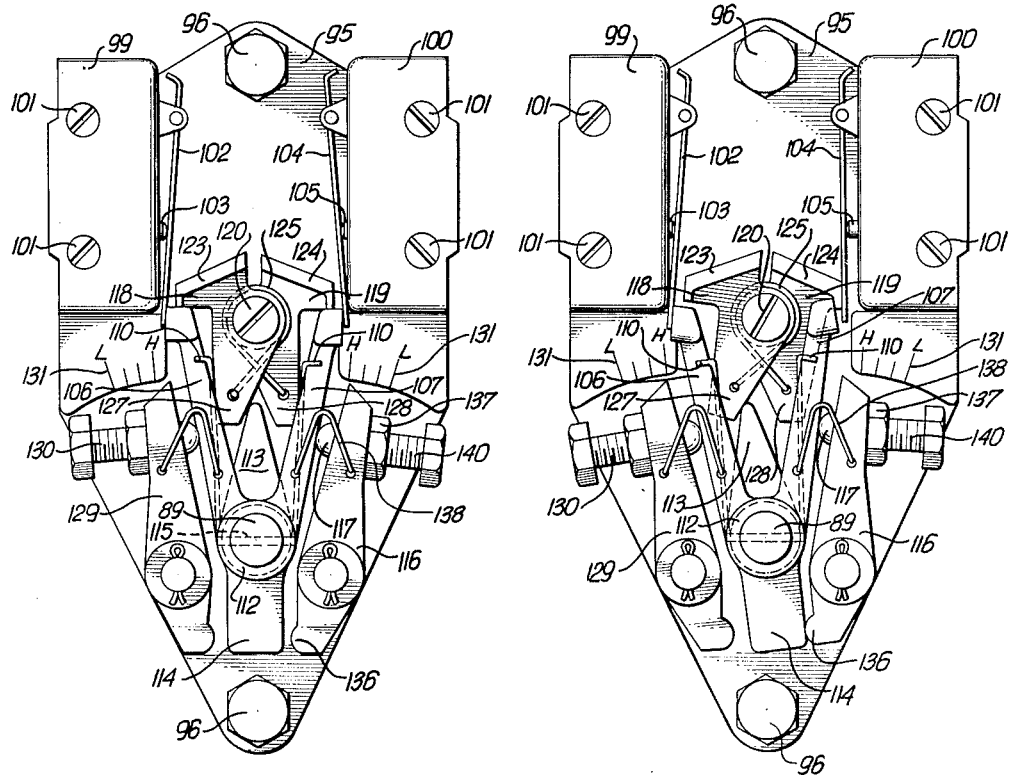
FIG. 9 is a view similar to FIG. 8, but illustrating another position of the apparatus.
FIG. 10 is a view similar to FIG. 8, but showing still another position of the apparatus.

A similar arrangement is provided for the circuit controller 100 which has an arm 104 operating a button or plunger 105. The position of FIG. 8 is one in which both of the plungers 103 and 105 are depressed. However, as hereinafter explained, upon an exertion of a torque above a desired value, one or the other of the arms 102, 104 is allowed to free its corresponding button. Such a position is shown in FIG. 10, the arm 104 freeing button 105.

By operation of the arm 86 in one or the other direction depending upon the direction of rotation of the motor 2, one or the other of the buttons or plungers 103 and 105 is released while the other button or plunger is left in the operative position. In order to depress the plunger 103 against the force exerted on the plunger tending to move it outwardly, use is made of a pivoted arm 106. A similar arm 107 is utilized to urge the plunger 105 inwardly. Both arms 106 and 107 are mounted for free rotation about the common axis 87, upon the left-hand portion of the shaft 89. They are provided with offset hubs 108 and 109 held against axial displacement in a manner to be hereinafter described. A hairpin spring 110 serves resiliently to urge them apart and toward the operative positions of FIG. 8. This hairpin spring makes several convolutions about a collar 111 mounted on the shaft 89. The collar 111 serves to hold the hubs 108 and 109 against an ear 112 between an arm 113 integrally joined to ear 112 as by the member or arm 114. The arm 114 and the arm 113 form a lever fastened as by the pin 115 to shaft 89, and angularly moved by arm 86 about axis 87.

Latches are provided for holding one or the other of the actuating arms 106 and 107 out of engagement with the respective operating arms 102 and 104. These latches 118 and 119 are mounted on a common pivot pin 120 having a cylindrical portion serving as a bearing for the hubs of these latches and having a reduced threaded extension 121 passing through an appropriate aperture in the bracket 95 for attachment to the bracket by the aid of the nut 122.

Each latch 118 and 119 has a latching member 123 and 124 or are urged respectively in opposite directions by the aid of a coil spring 125 that is disposed around the hub of the latch 118, and engaging arms 127, 128 extending from the members 123 and 124. The latching members 123 and 124 in the position of FIG. 8 are both inactive, and this occurs when motor 2 is deenergized and the parts assume a symmetrical position. The latches rest against the upper surfaces 126 of the arms 106 and 107.

Between the depending arms 127 and 128 there is located the arm 113. In the position shown in FIG. 8, the circuit controllers 99 and 100 condition the motor 2 so that it may be started in either direction. FIG. 9 illustrates the initial resetting operation just after the motor 2 is energized to move the valve closure 1 toward closed position. The clearance between collar 79 (FIG. 5) and wall 80 is taken up, and arm 113 has moved latch 123 out of restraining position. FIG. 9 corresponds to normal running in the closing direction. The circuit controllers 99 and 100 are active to energize the motor 2 for either raising or lowering the valve closure 1.

When the torque exceeds a definite value, extension 71 (FIG. 5) causes an effective angular movement of lever arm 86. The lever 113–114 assumes the position of FIG. 10, corresponding to a further counter-clockwise angle of movement to open the circuit controller 100. The arm 114 moves into contact with the knob 136 of a lever arm 116. This lever arm carries a rounded projection 117 formed at the end of a screw 140 threaded into the arm 116 and held in adjusted position by a nut 137. The knob or projection 117 is urged against the arm 107 by the aid of a hairpin spring 138.

In the position of FIG. 10, the arm 107 has been moved by arm 116 out of operative position with respect to the circuit controller 100, thereby causing deenergization of the motor 2. But by virtue of the previous action of arm 106 upon switch actuator 102, the circuits for conditioning the motor to move the valve closure upwardly have already been reset for that purpose.

The amount of torque required to obtain these effects is adjustable by the aid of the screw 140 which may be threaded in or out of the arm 116 so as to adjust the spacing between the arm 114 and the knob 136. Thereby there ensues an adjustment the amount through which the lever 113–114 must move before contact is established between these two parts 114 and 136. Scale marks 131 on bracket 95 facilitates setting of screw 140.

Symmetrically spaced with respect to the lever 113–114 is another arm 129, similar in every respect to arm 116 and carrying an adjustable screw 130. Upon starting of the motor 2 in the "up" direction, the arm 113 moving in a clockwise direction, releases latch 124 to condition the motor circuits for downward or closing operation of the valve closure 1. When a torque beyond set limits is exerted, the screw 130 serves to move the operating arm 106 to a latching position with latch 123 of FIG. 9. Upon reenergization of the motor 2 to carry the valve closure 1 toward closing position, the arm 113 causes release of the latch 123. This resets the motor circuits to permit opening energization of the motor 2; but arm 107 remains in active position until the torque reaches a definite value. Under such circumstances, arm 107 is moved by arm 113 to the position of FIG. 10, the cycle being then completed.

Figure 12:
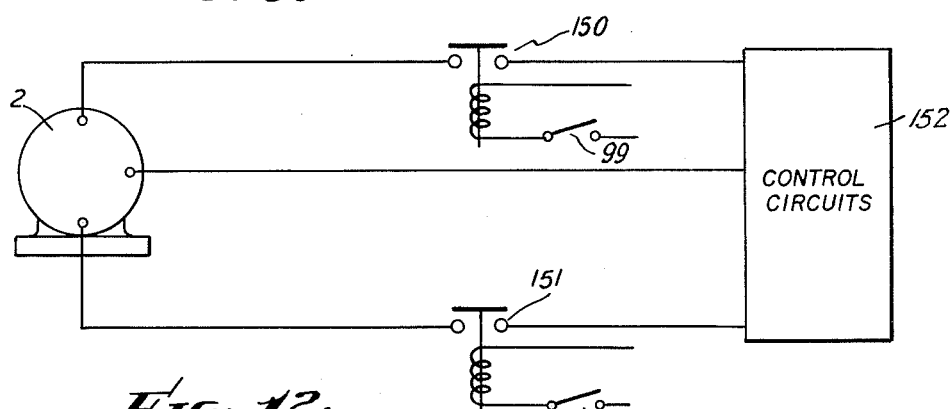
FIG. 12 is a schematic wiring diagram of the motor and the controlling circuits.

FIG. 12 schematically illustrates the application of the invention to the control of the motor 2. The control circuits 152 can be of any desired type. The circuit controllers 99 and 100 may operate the switches 150, 151, so as to condition the motor 2 to be operated by circuits 152 in either direction. When proceeding in the "up" direction the switch 99 is opened upon excessive torque in this "up" direction of motion, and switch 100 is closed to condition the motor for "down" movement.

In the form shown in FIG. 11, only circuit controller 99 is utilized so that excessive torque only in the "up" direction can be prevented. Thus, in the position shown in FIG. 11, the circuits are so arranged that the gate valve 1 may be moved upwardly. As soon as the torque exceeds a definite value, the arm 114 moving in a closing direction causes movement of the arm 129 to disengage actuating arm 106 from the plunger 103. The latch 123 then holds it in this disengaging position. However, as soon as reverse rotation is effected for the motor 2, the arm 113 serves to release the latch 123 and upward movement may then again be permitted.

The inventor claims:
1. In a motor drive system for a reversible load, a motor having two directions of rotation, a member movable from a neutral position in either of two directions a distance corresponding to the magnitude of torque exerted by the motor in corresponding directions, a circuit controller for reversing the direction of rotation of said motor, and means for operating said circuit controller responsive to the movement of said member in a first direction a distance corresponding to the magnitude of torque in excess of a predetermined amount; said means comprising an operator, means responsive to the movement of said operator for actuating said circuit controller, a first lever arm in mechanical association with said operator and a second lever arm adjacent said first lever arm and spaced a pre-determined distance therefrom; means on said member responsive to the first said movement thereof for moving said second lever arm into mechanical association with said first lever arm and responsive to the last said movement thereof for jointly moving said first lever arm, said second lever arm and said operator, and latching means operable responsive to movement of said operator for latching said operator in its said moved position.

2. A motor-driven system as set forth in claim 1 wherein the said member includes means for moving said latching means out of latching engagement with said operator responsive to movement of the said member in a second direction.

3. In a motor-drive system for a reversible load, a motor having two directions of rotation, a member movable from a neutral position in either of two directions a distance corresponding to the magnitude of torque exerted by the motor in corresponding directions, first and second circuit controllers for operating said motor in first and second directions respectively, first means for operating the first circuit controller responsive to the movement of said member in a first direction a distance corresponding to the magnitude of torque in excess of a predetermined amount and second means for operating the second circuit controller responsive to the movement of said member in a second direction a distance corresponding to the magnitude of torque in excess of a predetermined amount; each said first and second means including an operator, means responsive to the movement of the operator for actuating the associated circuit controller, a first lever arm in mechanical association with the associated operator and a second lever arm adjacent the associated first lever arm and spaced a predetermined distance therefrom; means on said member responsive to the said first movement thereof for moving one of said second lever arms into mechanical association with the associated second lever arm and responsive to the last-said movement thereof in the same direction for jointly moving the last-said first and second lever arms and associated operator, and each said first and second means including latching means operable responsive to movement of an associated operator for latching the last-said operator in its said moved position.

4. A motor-driven system as set forth in claim 3 wherein said member includes means for moving the last-said latching means out of latching engagement with the associated operator responsive to movement of said member in a direction opposite the last-said direction of movement.

5. A motor-drive system as set forth in claim 3 wherein means are provided for adjusting the said predetermined distance that said first and second associated lever arms are spaced apart.

References Cited by the Examiner
UNITED STATES PATENTS

| | | | |
|---|---|---|---|
| 2,005,891 | 6/1935 | Elberty | 318—475 X |
| 2,276,740 | 3/1942 | Saito | 200—47 |
| 2,352,815 | 7/1944 | Valkenburg | 200—47 |
| 2,600,568 | 6/1952 | Nelson | 318—475 X |

BERNARD A. GILHEANY, *Primary Examiner.*

ORIS L. RADER, ROBERT K. SCHAEFER, *Examiners.*